(12) United States Patent
Maekawa (10) Patent No.: US 10,224,793 B2
(45) Date of Patent: Mar. 5, 2019

(54) MAGNET-TYPE POWER GENERATOR AND METHOD OF MANUFACTURING THE SAME

(75) Inventor: Toshio Maekawa, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 91 days.

(21) Appl. No.: 13/614,860

(22) Filed: Sep. 13, 2012

(65) Prior Publication Data

US 2013/0307353 A1   Nov. 21, 2013

(30) Foreign Application Priority Data

May 16, 2012  (JP) ................. 2012-112034

(51) Int. Cl.
*H02K 9/06* (2006.01)
*H02K 21/22* (2006.01)
*H02K 1/27* (2006.01)
*H02K 15/12* (2006.01)

(52) U.S. Cl.
CPC .......... *H02K 21/22* (2013.01); *H02K 1/2786* (2013.01); *H02K 9/06* (2013.01); *H02K 15/12* (2013.01)

(58) Field of Classification Search
CPC .......... Y02E 60/16; H02K 7/025; H02K 7/09; H02K 1/278; H02K 1/14; H02K 21/14; H02K 1/2733; H02K 29/03; H02K 1/2786
USPC ... 310/74, 156.12, 156.13, 156.46, 265, 153
See application file for complete search history.

(56) References Cited

U.S. PATENT DOCUMENTS

| | | | | |
|---|---|---|---|---|
| 4,873,962 A | * | 10/1989 | Safranek | ........................ 123/599 |
| 5,345,130 A | * | 9/1994 | Kliman | ................ H02K 1/2733 |
| | | | | 310/156.13 |
| 6,429,564 B1 | * | 8/2002 | Uemura | ............... H02K 1/2786 |
| | | | | 123/149 D |
| 2001/0006292 A1 | * | 7/2001 | Inaba et al. | .................. 290/38 R |
| 2002/0047334 A1 | * | 4/2002 | Aoshima | ..................... 310/49 R |
| 2002/0153793 A1 | * | 10/2002 | Hatz et al. | ............... 310/154.12 |
| 2003/0222520 A1 | | 12/2003 | Yokota | |
| 2008/0024018 A1 | * | 1/2008 | Rignault et al. | ................. 310/42 |
| 2008/0143204 A1 | * | 6/2008 | Hashiba | ......................... 310/74 |
| 2009/0085416 A1 | * | 4/2009 | Masuzawa et al. | ............ 310/44 |
| 2010/0033050 A1 | * | 2/2010 | Kobayashi et al. | ..... 310/156.12 |

(Continued)

FOREIGN PATENT DOCUMENTS

| | | | | |
|---|---|---|---|---|
| CN | 2711976 Y | | 7/2005 | |
| JP | 57016561 | * | 1/1982 | ............. H02K 21/08 |
| JP | 62-119179 U | | 7/1987 | |

(Continued)

OTHER PUBLICATIONS

Japanese Office Action, dated Sep. 3, 2013, Patent Application No. 202-112034.

(Continued)

*Primary Examiner* — Terrance Kenerly (74) *Attorney, Agent, or Firm* — Sughrue Mion, PLLC; Richard C. Turner (57) ABSTRACT

A magnet-type power generator includes a rotor having a bowl-shaped flywheel and plural magnets disposed on an inner circumferential surface of the flywheel so as to be spaced at a predetermined interval, and a stator having plural cores facing the magnets and each having a coil wound therearound. The magnets include a bonded magnet integrally molded with the flywheel.

5 Claims, 11 Drawing Sheets

(56) References Cited

U.S. PATENT DOCUMENTS

2011/0109181 A1* 5/2011 Ohshima et al. ............... 310/81

FOREIGN PATENT DOCUMENTS

| | | |
|---|---|---|
| JP | 8-126264 A | 5/1996 |
| JP | 2000-37054 A | 2/2000 |
| JP | 2003-284267 A | 10/2003 |
| JP | 2003-333801 A | 11/2003 |
| JP | 2010-233432 A | 10/2010 |
| JP | 2011-101495 A | 5/2011 |

OTHER PUBLICATIONS

Communication dated Nov. 20, 2015 from The State Intellectual Property Office of the P.R.C in counterpart application No. 201210580797.8.
Communication dated Mar. 27, 2015 from the State Intellectual Property Office of the P.R.C. in counterpart application No. 201210580797.8.

* cited by examiner

MAGNET-TYPE POWER GENERATOR AND METHOD OF MANUFACTURING THE SAME

BACKGROUND OF THE INVENTION

1. Field of the Invention

This invention relates to a magnet-type power generator mounted to an engine for motorcycles, all-terrain vehicles, snowmobiles, and outboard engines, and to a method of manufacturing the same.

2. Description of the Related Art

Recently, the engines to which a magnet-type power generator is mounted are required to have a longer lifetime for the purpose of quality improvement in the market. In particular, the rotor of the magnet-type power generator, fitted to the crankshaft, rotates at all times with the crankshaft. Therefore, if the rotor breaks, the function of the engine degrades and moreover the broken parts scatter, posing a danger to the driver. For this reason, the rotor needs particular attention so that it does not break even when used for a long time. The rotor of the magnet-type power generator has a magnet for generating magnetic flux and a flywheel, made of an iron-based material, for accommodating the magnet. Since the magnet easily fracture, a ring-shaped part of an iron-based material is generally added for the purpose of protecting and securing the magnet. However, only the ring-shaped part cannot secure the magnet completely, and the magnet may fracture when it is under the vibrations of the engine. For this reason, it is common to secure the magnet using an adhesive agent in combination with the ring-shaped part.

When securing the magnet with an adhesive agent, it is impossible to ensure stable bonding strength unless the adhesive agent is applied uniformly. Moreover, in order to harden the adhesive agent, a heating apparatus is necessary in the case of heat setting, or a long setting time is necessary in the case of cold setting. As a remedy for the problem, for example, in Patent Document 1, no adhesive agent is used, and the flywheel, the magnet, and the ring-shaped part are integrally molded with each other from a thermoplastic resin. In addition, in order to make the fabrication of the ring-shaped part easier and less costly and facilitate the assembling work, the ring-shaped part is made by bending a plate material. The technique of provisionally securing the position of the magnet by the ring-shaped part made by bending a plate material and thereafter integrally molding the flywheel, the magnet, and the ring-shaped part not only makes the assembling work easier but also can secure the magnet to completely at the same condition.

Patent Document 1: JP-UM-62-119179

Although the technique disclosed in Patent Document 1 can secure the magnet reliably and therefore makes it possible to increase the reliability, it requires an expensive non-magnetic material, such as SUS, to be used for the ring-shaped part, in order to prevent degradation of the magnetic characteristics. Moreover, in order to form a shape for provisionally securing the magnet to the ring-shaped part made by bending a plate material, a mold for progressive pressing is required when the productivity is taken into consideration. Furthermore, in order to mold a thermoplastic resin, a mold for injection molding is necessary. Another problem is that since the thermoplastic resin fills the gap between the flywheel and the ring-shaped part not just the surrounding portions of the magnet, the weight increases.

SUMMARY OF THE INVENTION

This invention solves such problems in the past, and it is an object of the invention to provide a magnet-type power generator that may increase the reliability by reliably securing the magnet, that may simplify the assembling procedure by reducing the parts count, and that may achieve cost reduction. The invention also provides a method of manufacturing the magnet-type power generator.

This invention provides a magnet-type power generator including a rotor and a stator. The rotor has a bowl-shaped flywheel and plural magnets disposed on an inner circumferential surface of the flywheel so as to be spaced at a predetermined interval. The stator has plural cores facing the magnets and each having a coil wound therearound. In the magnet-type power generator, the magnet includes a bonded magnet integrally molded with the flywheel.

The magnet-type power generator of this invention makes it possible to integrally mold the magnet with the flywheel in the molding step of forming the shape of the magnet because a bonded magnet is used as the magnet. In this way, the ring-shaped part for provisionally securing the magnet and the adhesive agent and molding resin for subsequently securing the magnet are not necessary. As a result, parts count may be reduced, and the assembling procedure may be simplified. Therefore, cost reduction can be achieved.

DETAILED DESCRIPTION OF THE INVENTION

First Embodiment

Figure 1:
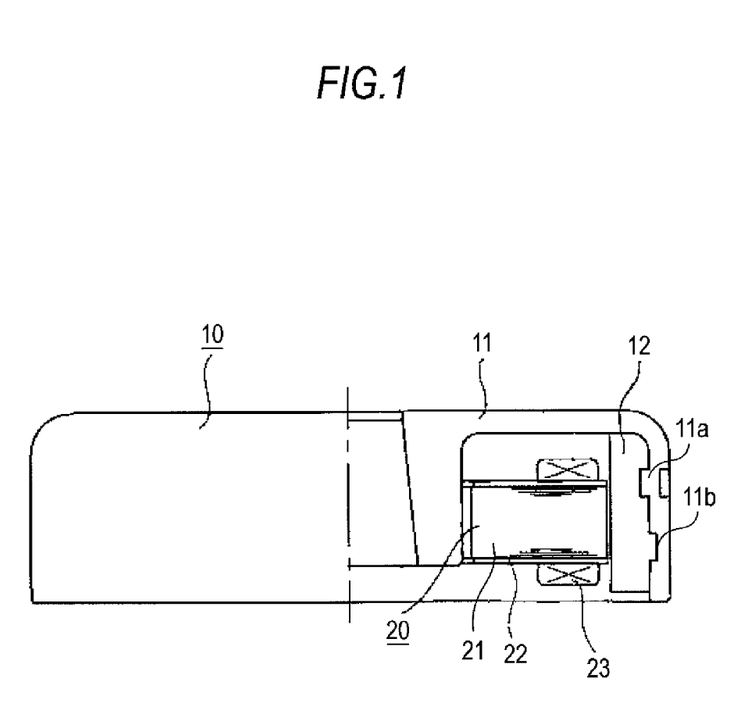
FIG. 1 is a partial cross-sectional view showing a magnet-type power generator according to a first embodiment of this invention.
Figure 2:
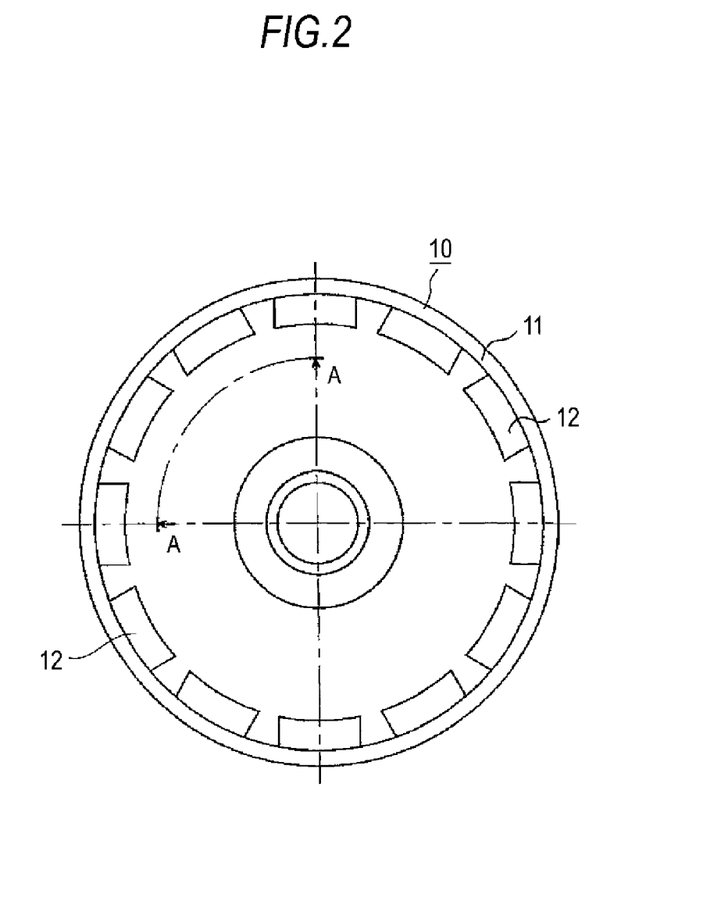
FIG. 2 is a bottom view of a rotor of the first embodiment.
Figure 3:
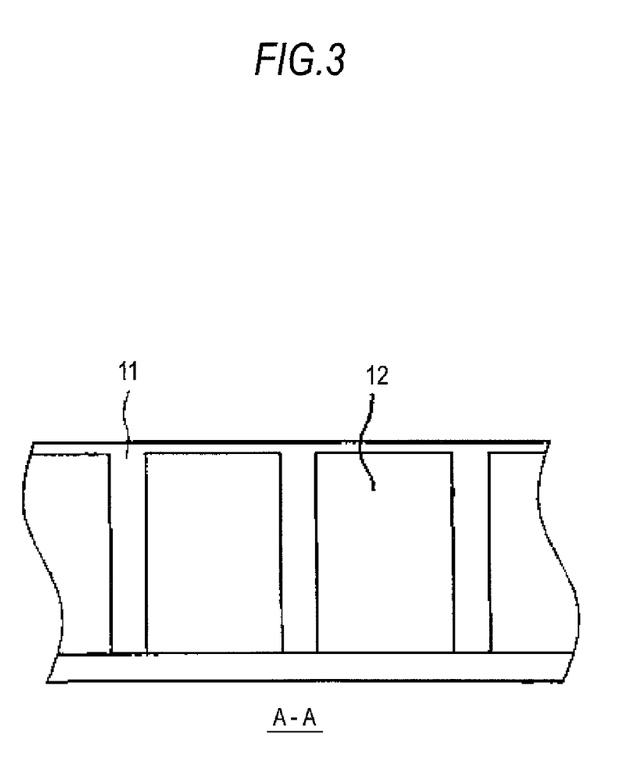
FIG. 3 is a partially developed view of the rotor of the first embodiment.

FIGS. 1 through 3 show the structure of a magnet-type power generator according to a first embodiment of this invention. FIG. 1 is a partial cross-sectional view showing the magnet-type power generator, FIG. 2 is a bottom view of a rotor, and FIG. 3 is a partially developed view taken along line A-A in FIG. 1. Referring to FIG. 1, the magnet-type power generator according to this invention includes a rotor 10 fastened to a crankshaft (not shown) of an engine, and a stator 20 secured to an engine side. The rotor 10 has a bowl-shaped flywheel 11 made of an iron-based material, and magnets 12 that form magnetic poles and generate magnetic flux. The stator 20 includes a core 21, an insulating member 22 covering the surface of the core 21, and a coil 23 wound around the surface. When the rotor 10 rotates, electric current is generated in the stator coil 23 that is wound around the stator iron core 21. The electric current generated in the stator coil 23 is connected to an electric current controlling device on the engine side by lead wires and connectors, which are not shown in the drawings, so that it charges a battery.

The rotor 10 has plural bonded magnets, as the magnets 12 that form magnetic poles and generate magnetic flux, which are disposed at a predetermined interval on the inner circumferential surface of a flange portion of the flywheel 11 so as to face the cores 21 of the stator 20. The flywheel 11 has the function to ensure the moment of inertia of the engine and has substantially a circular shape with respect to the rotational axis. The flywheel 11 has a boss portion to be mounted to a crankshaft, not shown in the drawings, for transmitting rotation of the engine.

The magnets 12 mounted to the rotor 10 are hereinafter referred to as the "bonded magnets" 12. The bonded magnet 12 is a generic term of a compound permanent magnet formed by solidifying and molding magnet powder using a binder (binder agent), and a feature of the bonded magnet is that the content of the magnet powder that corresponds to a filler is greater than other composite materials. Since the bonded magnet contains a binder, the bonded magnet has high dimensional accuracy and a high degree of freedom of shape, and is excellent in mechanical properties. Moreover, since the bonded magnet can be molded using a mold, it may be mass-produced easily.

The bonded magnet 12 is integrated with the flywheel 11 by placing the flywheel 11 in a mold and injection molding them. At least one of a protruding portion 11a or a recessed portion 11b is provided in the inner face of the flange portion of the flywheel 11, and the bonded magnets 12 are also fitted into these portions. The bonded magnets 12, which have been fitted into the protruding portion 11a or the recessed portion 11b of the flywheel 11, are provided with the functions of preventing disengagement and preventing rotation by the anchoring effect, so the bonded magnets 12 are reliably secured to the flywheel 11.

Thus, the magnet-type power generator according to the first embodiment has the rotor 10 having the plural magnets disposed on the inner circumferential surface of the bowl-shaped flywheel 11 and spaced at a predetermined interval, and the stator 20 having plural cores 21 facing the magnets and each having the coil 23 wound therearound. In the magnet-type power generator, the magnets 12 are formed by bonded magnets integrally molded with the flywheel 11. By employing this structure, the positions of the bonded magnets 12 with respect to the flywheel 11 can determined by the injection mold for the bonded magnets 12. Therefore, the member for provisionally securing the magnets and the member for bonding and securing the magnets, which have been conventionally necessary, become unnecessary, and it becomes possible to achieve cost reduction. Moreover, since the bonded magnets 12 are secured to the flywheel 11 by injection molding, an adhesive agent and other resin parts are also unnecessary.

Second Embodiment

Figure 4:
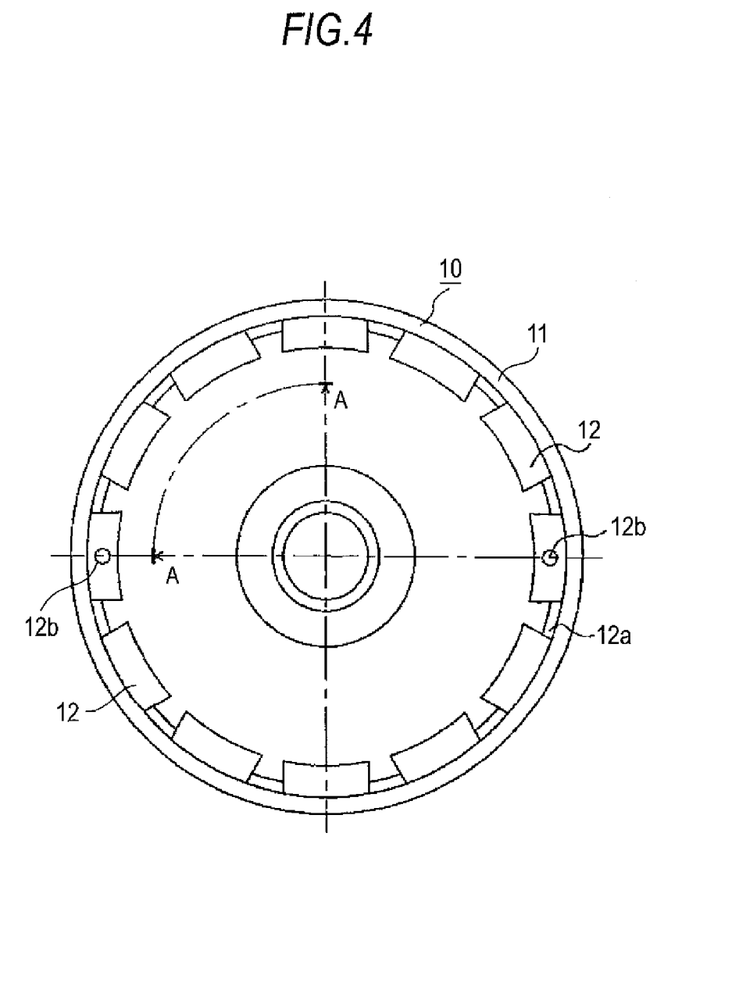
FIG. 4 is a bottom view showing a rotor of a magnet-type power generator according to a second embodiment of this invention.
Figure 5:
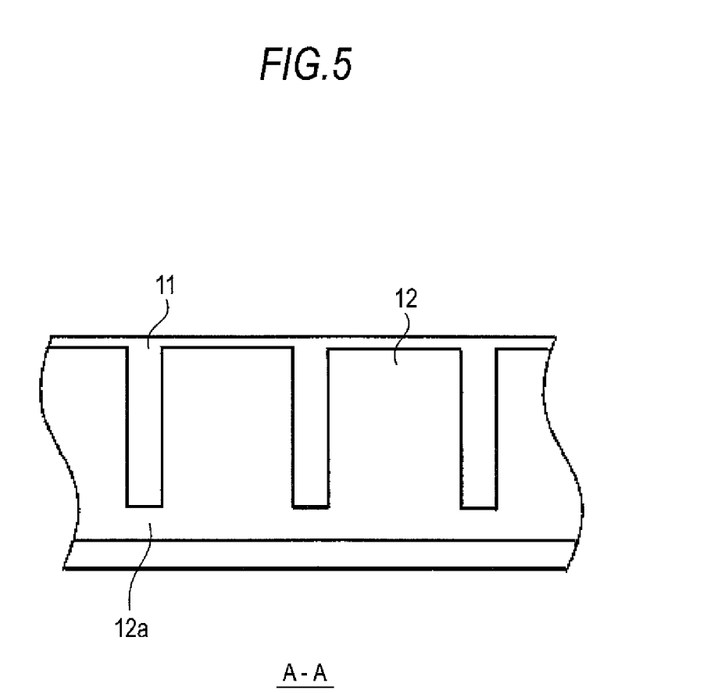
FIG. 5 is a partially developed view of the rotor of the second embodiment.

FIGS. 4 and 5 show a rotor of a magnet-type power generator according to a second embodiment of this invention. FIG. 4 is a bottom view of the rotor, and FIG. 5 is a partially developed view taken along line A-A in FIG. 4. In the second embodiment, the plural bonded magnets 12 are molded so as to be coupled to each other by coupling parts 12a formed on the bottom side of the flywheel 11. By coupling the plural bonded magnets 12 to each other by the coupling parts 12a in this way, the number of gate portions 12b for injecting bonded magnet in the injection molding of the bonded magnets 12 can be reduced.

FIG. 4 shows an example in which the number of the gate portions 12b is reduced to two gate portions, in the case where 12 gate portions would be necessary for 12 bonded magnets 12 that form 12 magnetic poles. When the number of the gate portions is reduced in this way, the structure of the mold can be made simple. Moreover, the number of runner portions that connect the nozzle of the injection molding machine to the gate portions can also be reduced, and therefore, loss of the material can also be reduced.

Third Embodiment

Figure 6:
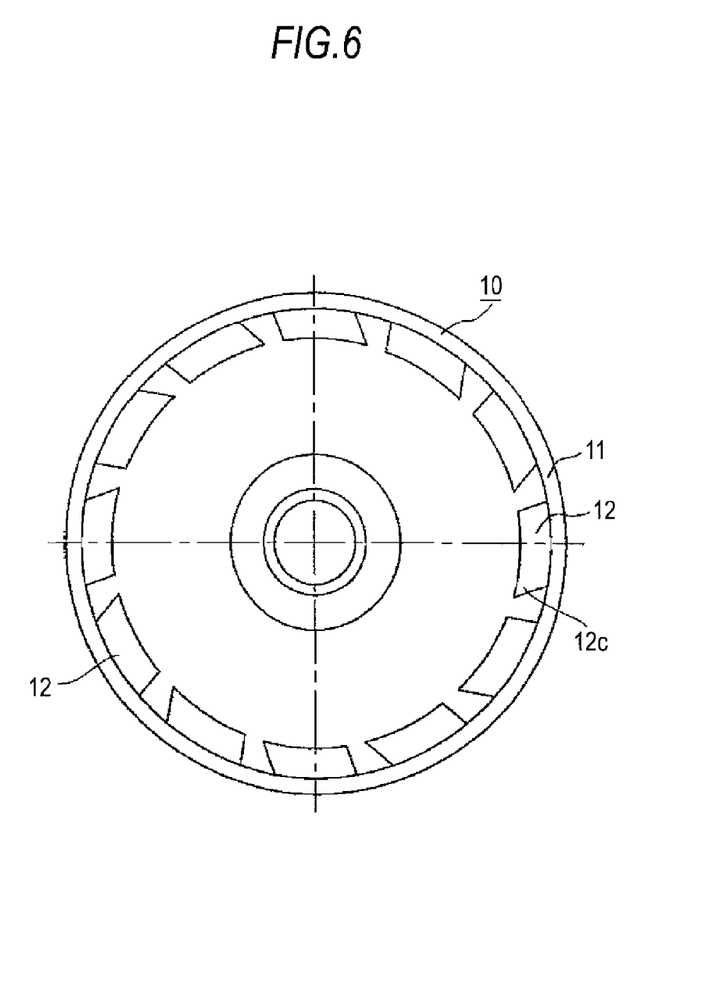
FIG. 6 is a bottom view showing a rotor of a magnet-type power generator according to a third embodiment of this invention.

FIG. 6 is a bottom view showing a rotor of a magnet-type power generator according to a third embodiment of this invention. In the third embodiment, the bonded magnet 12 has a fin portion 12c whose leading end is molded into a fin shape. When the bonded magnets 12 are molded in this way, airflow is generated inside the flywheel 11 by the fin portion 12c as the flywheel 11 rotates, so that the flywheel 11, the bonded magnets 12, and the coils 23 wound around the cores 21 of the stator 20, which are heat-generating portions. By lowering the temperature of the coil 23, the coil 23 is allowed to have a greater additional margin for heat resistance specification, which contributes to prolonging of the lifetime of the magnet-type power generator.

Fourth Embodiment

Figure 7:
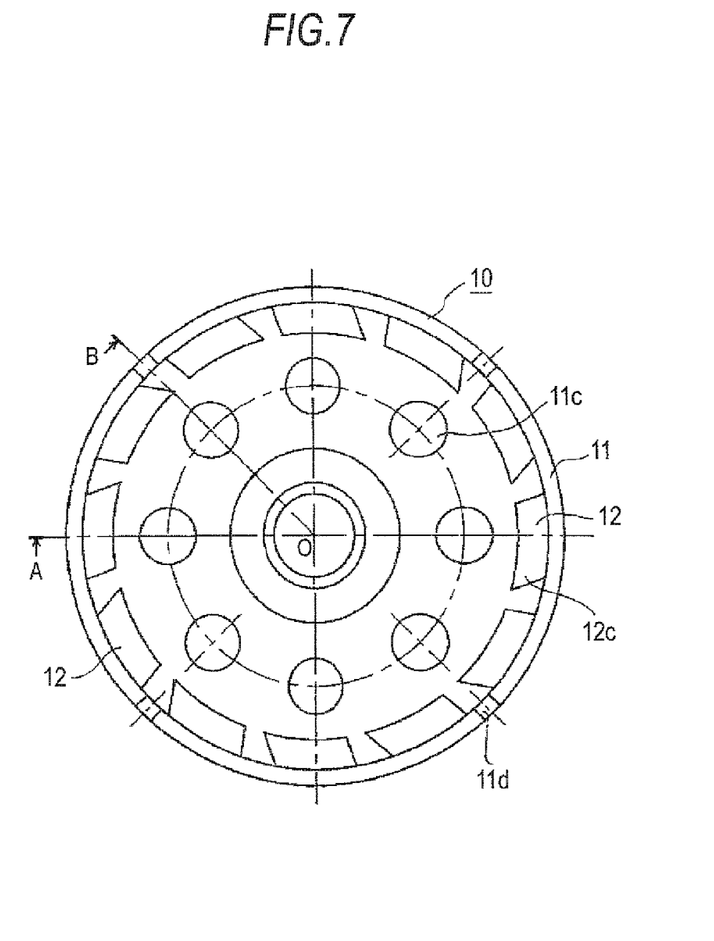
FIG. 7 is a bottom view showing a rotor of a magnet-type power generator according to a fourth embodiment of this invention.
Figure 8:
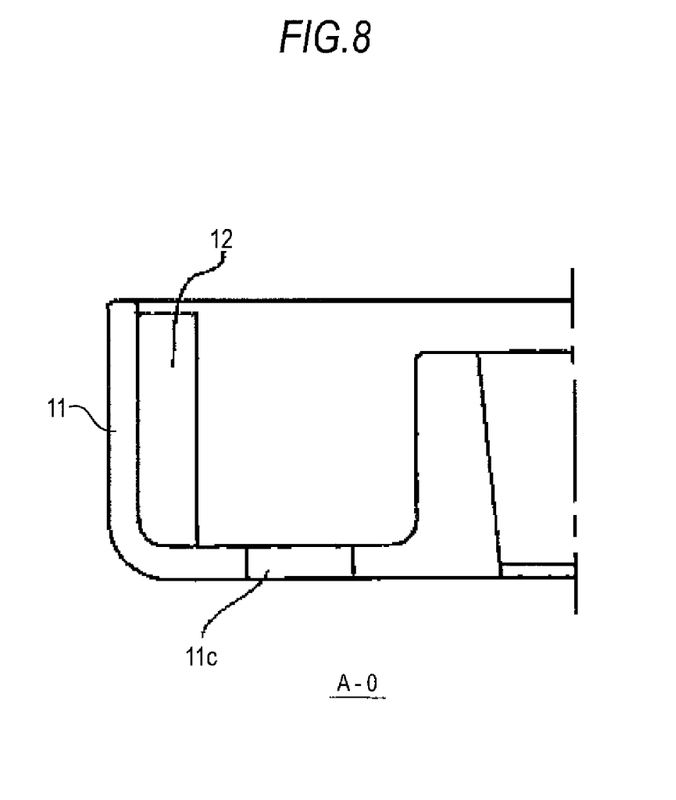
FIG. 8 is a partial cross-sectional view of the rotor of the fourth embodiment.
Figure 9:
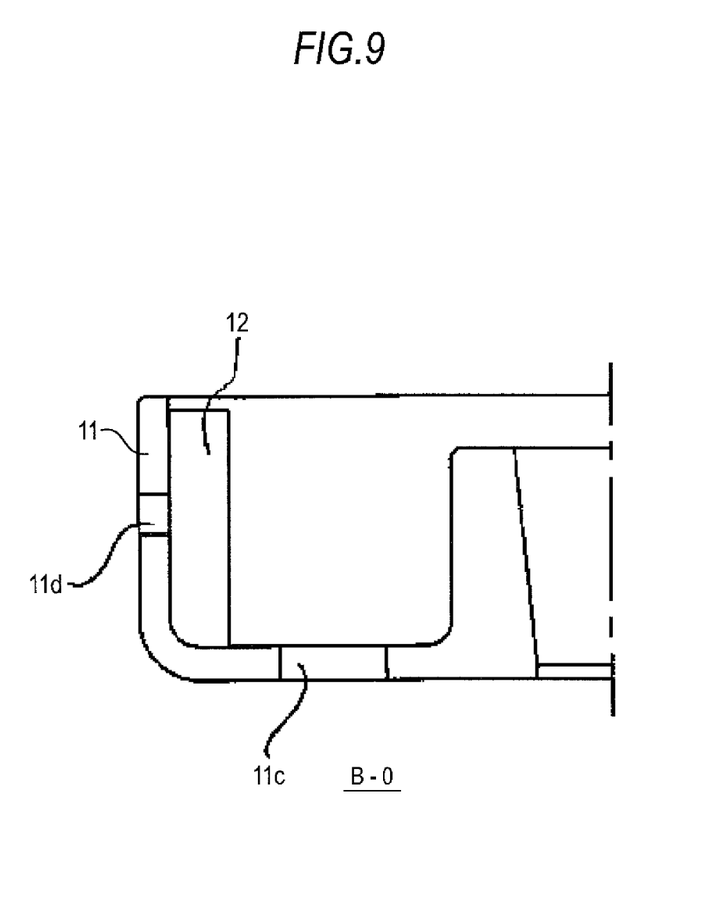
FIG. 9 is a partial cross-sectional view of the rotor of the fourth embodiment.

FIGS. 7 through 9 show a rotor of a magnet-type power generator according to a fourth embodiment of this invention. FIG. 7 is a bottom view of the rotor, FIG. 8 is a partial cross-sectional taken along line A-O in FIG. 7, and FIG. 9 is a partially developed view taken along line B-O in FIG. 7. In the fourth embodiment, vent holes 11c penetrating through the bottom part of the flywheel 11 are provided. By providing the vent holes 11c in the flywheel 11 in this way, the airflow in the flywheel 11 that is produced by the bonded magnet 12 having the fin portion 12c can be ventilated efficiently. It should be noted that the vent holes in the flywheel 11 may be provided at any position as long as ventilation can be performed efficiently. For example, it is also possible that vent holes 11d may be provided in the flange portion of the flywheel 11.

Fifth Embodiment

Figure 10:
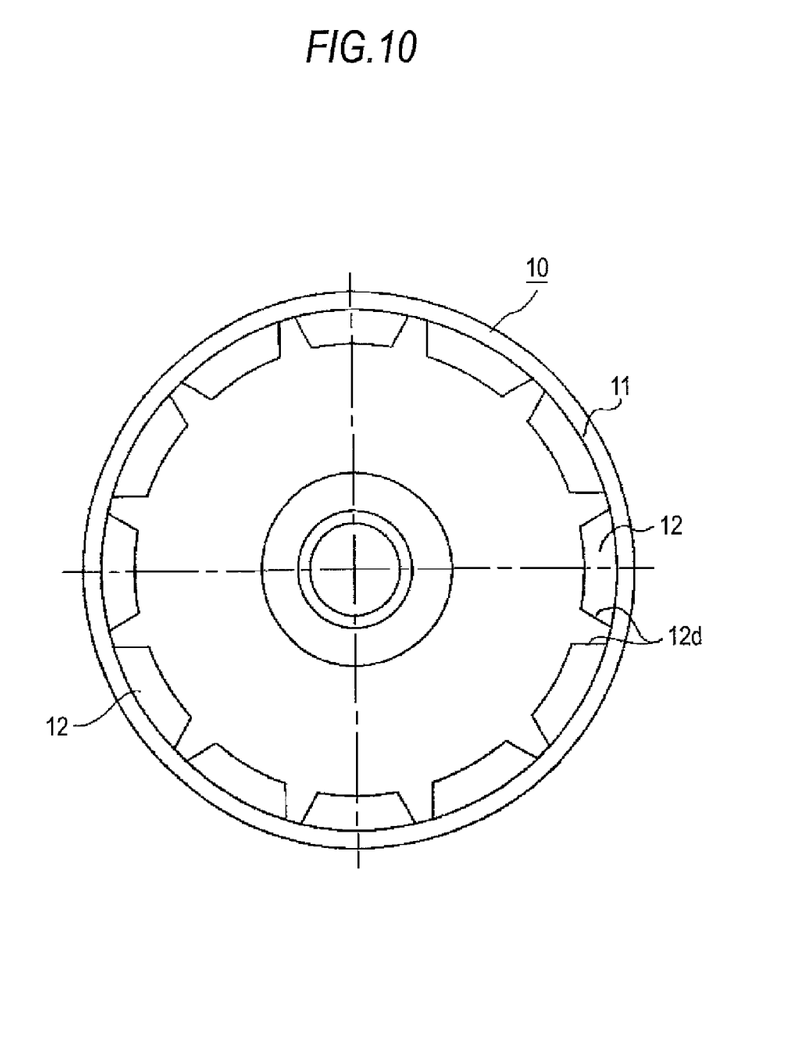
FIG. 10 is a bottom view showing a rotor of a magnet-type power generator according to a fifth embodiment of this invention.

FIG. 10 is a bottom view showing a rotor of a magnet-type power generator according to a fifth embodiment of this invention. In the fifth embodiment, slope portions 12d are formed at both side edges of the bonded magnet 12 that face the stator 20. In the magnet-type power generator, torque loss occurs when the rotor 10 passes through the vicinity of the magnetic poles of the stator 20. However, the torque loss can be reduced by providing the slope portions 12d at both side edges of the bonded magnet 12, which are the magnetic poles of the rotor side. Thus, with the bonded magnet 12, the shape of the portion that faces the stator 20 can be configured freely. Therefore, the power generation performance can be set while taking torque loss into consideration.

Figure 11:
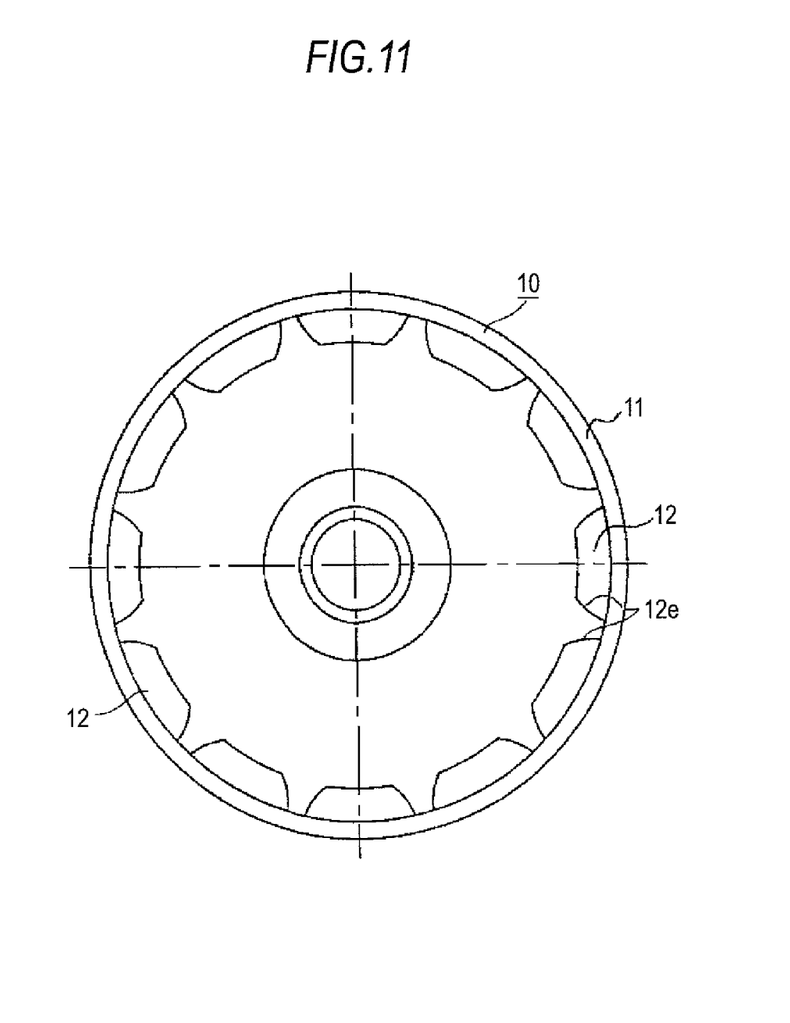
FIG. 11 is a bottom view showing another example of the rotor of the magnet-type power generator according to the fifth embodiment of this invention.

It should be noted that although the slope portions 12d are provided at both side edges of the bonded magnet 12 in FIG. 10, the slope portion may be provided as long as the effect of reducing the torque loss. For example, the slope portion of the bonded magnet 12 need not have a linear line slope, and the slope portion may be an arc shape d slope portion 12e, as shown in FIG. 11.

Sixth Embodiment

Although not shown in the drawings, it is possible that rust may form when the bonded magnet 12 is in the condition of magnet alone because NdFeB magnet or the like is generally used for the bonded magnet 12. Since the flywheel 11 is made of an iron-based material, the flywheel 11 is generally plated or painted to prevent the formation of rust. When the bonded magnet 12 is used, the flywheel 11 and the bonded magnet 12 are integrally formed. Therefore, the flywheel 11 and the bonded magnet 12 can be plated or painted after they are integrally formed. In this way, it is unnecessary to perform plating or painting for individual parts, and it is possible to simplify the processing procedure. Therefore, it becomes possible to achieve cost reduction.

Seventh Embodiment

Although not shown in the drawings, the bonded magnet 12 is exposed to outside when it is in the condition of the rotor of the magnet-type power generator because the bonded magnet 12 is not integrally molded with a thermoplastic resin or the like, so there is a possibility that moisture may be attached thereto. Nylon-based resins are commonly used as the resin for the binder of the bonded magnet 12, so when a PPS resin is used for the binder taking into consideration the deterioration of the resin caused by hydrolysis, the deterioration of the resin can be lessened and the magnet shape can be maintained stably even in an environment in which moisture may be attached thereto. This contributes to prolonging of the lifetime of the magnet-type power generator.

Various modifications and alterations of this invention will be apparent to those skilled in the art without departing from the scope and spirit of this invention, and it should be understood that this invention is not limited to the illustrative embodiments set forth herein.

What is claimed is:

1. A magnet-type power generator comprising:
a rotor having a bowl-shaped flywheel and a plurality of magnets disposed on an inner circumferential surface of the flywheel so as to be spaced at a predetermined interval; and
a stator having a plurality of cores facing the magnets, each having a coil wound therearound,
wherein the plurality of magnets comprises a plurality of bonded magnets integrally molded with the flywheel on the inner circumference surface and a bottom surface of the flywheel,
wherein the bonded magnets are molded so as to be coupled to each other by coupling parts formed on a bottom side of the flywheel.

2. A method of manufacturing a magnet-type power generator comprising a rotor having a bowl-shaped flywheel and a plurality of magnets disposed on an inner circumferential surface of the flywheel so as to be spaced at a predetermined interval, and a stator having a plurality of cores facing the magnets and each having a coil wound therearound, the method comprising:
using a bonded magnet as at least one of the plurality of magnets; and
injection molding the bonded magnet integrally with the flywheel on the inner circumference surface and a bottom surface of the flywheel.

3. The method of manufacturing a magnet-type power generator according to claim 2, further comprising:
after injection molding the bonded magnet, plating the bonded magnet simultaneously with the flywheel.

4. A magnet-type power generator comprising:
a rotor having a bowl-shaped flywheel and a plurality of magnets disposed on an inner circumferential surface of the flywheel so as to be spaced at a predetermined interval; and
a stator having a plurality of cores facing the magnets, each having a coil wound therearound,
wherein the plurality of magnets comprises a plurality of bonded magnets integrally molded with the flywheel on the inner circumference surface and a bottom surface of the flywheel,
wherein a bonded magnet of the plurality of bonded magnets has a first slope portion at a first side edge and a second slope portion at a second side edge, the first slop portion of the first side edge being substantially parallel to the second slope portion of the second side edge.

5. The method of manufacturing a magnet-type power generator according to claim 2, wherein the inner circumference surface comprises at least one of a protruding portion and a recessed portion for fitment of the plurality of bonded magnets.

* * * * *